United States Patent
Nefacy et al.

(10) Patent No.: US 9,353,801 B2
(45) Date of Patent: May 31, 2016

(54) ELECTRIFIED VEHICLE POWERTRAIN CLUTCH

(71) Applicant: FORD GLOBAL TECHNOLOGIES, LLC, Dearborn, MI (US)

(72) Inventors: Bernard D. Nefacy, Novi, MI (US); Walter Joseph Ortmann, Saline, MI (US); Brian Richard Light, Flat Rock, MI (US); Brian Thomas Soo, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 89 days.

(21) Appl. No.: 14/468,203

(22) Filed: Aug. 25, 2014

(65) Prior Publication Data

US 2016/0053822 A1 Feb. 25, 2016

(51) Int. Cl.
*F16D 11/16* (2006.01)
*B60K 17/02* (2006.01)

(52) U.S. Cl.
CPC .............. *F16D 11/16* (2013.01); *B60K 17/02* (2013.01)

(58) Field of Classification Search
CPC ......... F16D 11/00; F16D 11/14; F16D 11/16; F16D 2011/008
See application file for complete search history.

(56) References Cited

U.S. PATENT DOCUMENTS

| | | | | |
|---|---|---|---|---|
| 2,753,725 | A * | 7/1956 | De Vlieg | B23F 15/06 192/69.8 |
| 4,280,583 | A * | 7/1981 | Stieg | B60K 17/346 180/250 |
| 5,038,884 | A * | 8/1991 | Hamada | B60K 17/35 180/233 |
| 8,424,622 | B2 * | 4/2013 | Ideshio | B60K 6/387 180/65.225 |
| 2012/0279334 | A1 * | 11/2012 | Gaully | F02C 7/275 74/333 |
| 2013/0230352 | A1 * | 9/2013 | Goulet | A01B 71/06 403/364 |
| 2013/0297122 | A1 | 11/2013 | Gibson et al. | |
| 2014/0166422 | A1 * | 6/2014 | Goleski | F16D 25/061 192/48.5 |
| 2014/0236443 | A1 * | 8/2014 | Rodrigues | B60K 28/165 701/69 |

FOREIGN PATENT DOCUMENTS

| CN | 202901110 | 4/2013 |
|---|---|---|
| FR | 2913225 | 9/2008 |
| JP | 2009293675 | 12/2009 |

* cited by examiner

*Primary Examiner* — Jacob S Scott
(74) *Attorney, Agent, or Firm* — Carlson, Gaskey & Olds, P.C.

(57) ABSTRACT

An exemplary clutch device of an electrified vehicle includes a first member having a plurality of lugs about an axis, and a second member including a plurality of apertures. The plurality of lugs are selectively moveable axially into corresponding apertures to couple together rotation of the first member and the second member. Interfaces between the first member and the second member when under positive torque are angled differently than interfaces between the first member and the second member when under negative torque.

14 Claims, 7 Drawing Sheets

ELECTRIFIED VEHICLE POWERTRAIN CLUTCH

BACKGROUND

Generally, electrified vehicles differ from conventional motor vehicles because electrified vehicles include one or more electric machines powered by batteries. The electric machines can selectively drive the vehicle. Conventional motor vehicles, in contrast to electrified vehicles, are driven exclusively by an internal combustion engine. Example electrified vehicles include hybrid electric vehicles (HEVs), plug-in hybrid electric vehicles (PHEVs), and battery electric vehicles (BEVs).

The powertrains of electric vehicles can include clutches. Engaging and disengaging the clutches can cause disturbances that affect, among other things, drivability of the electrified vehicle.

SUMMARY

A clutch device of an electrified vehicle, according to an exemplary aspect of the present disclosure includes, among other things, a first member distributed annularly about an axis, a plurality of lugs each including a driving surface and a driven surface disposed at different angles relative to the axis. The driving surface faces circumferentially and selectively contacts a second member to rotate the second member. The driven surface faces circumferentially and selectively contacts the second member to rotate the first member with the second member.

In a further non-limiting embodiment of the foregoing clutch device, the first member is moveable relative to the second member along the axis from an engaged position with the second member to a disengaged position with the second member.

In a further non-limiting embodiment of any of the foregoing clutch devices, the plurality of lugs are received within apertures of the second member when the first member is in the engaged position, and the plurality of lugs are withdrawn from the apertures when the first member is in the disengaged position.

In a further non-limiting embodiment of any of the foregoing clutch devices, an angle between the driving surface and the axis is greater than an angle between the driven surface and the axis.

In a further non-limiting embodiment of any of the foregoing clutch devices, the driving surface and the driven surface are planar.

In a further non-limiting embodiment of any of the foregoing clutch devices, an inner diameter of the first member includes a plurality of teeth projecting inwardly toward the axis.

In a further non-limiting embodiment of any of the foregoing clutch devices, the driving surface and the driven surface are tapered.

In a further non-limiting embodiment of any of the foregoing clutch devices, the first member is a portion of a dog clutch.

In a further non-limiting embodiment of any of the foregoing clutch devices, an electrified vehicle includes the clutch device, and the driving surface contacts the second member to rotatably couple an internal combustion engine with a drive shaft.

In a further non-limiting embodiment of any of the foregoing clutch devices, an electrified vehicle includes the clutch device and a drive shaft is arranged in parallel to an electric drive system. The internal combustion engine is configured to drive the electric drive system when the clutch device is disengaged.

A clutch device of an electrified vehicle according to another exemplary aspect of the present disclosure includes, among other things, a first member having a plurality of lugs about an axis, and a second member including a plurality of apertures. The plurality of lugs are selectively moveable axially into corresponding apertures to couple together rotation of the first member and the second member. Interfaces between the first member and the second member when under positive torque are angled differently than interfaces between the first member and the second member when under negative torque.

In a further non-limiting embodiment of the foregoing clutch device, the plurality of lugs extend from an axially facing surface of the first member, each of the plurality of lugs has a first side and a second side. The first side faces in a first circumferential direction and is disposed at a first angle relative to the axially facing surface. The second side faces in an opposite, second circumferential direction and is disposed at a second angle relative to the axially facing surface. The first angle is different than the second angle.

In a further non-limiting embodiment of any of the foregoing clutch devices, the interfaces between the first member and the second member under positive torque have a first angle relative to the axis, and the interfaces between the first member and the second member under negative torque have a second angle relative to the axis that is less than the first angle.

In a further non-limiting embodiment of any of the foregoing clutch devices, an electrified vehicle includes the clutch device, and coupling the first member in rotation with the second member rotatably couples an internal combustion engine with a drive shaft of the electrified vehicle.

In a further non-limiting embodiment of any of the foregoing clutch devices, an electrified vehicle includes the clutch device, and decoupling the first member from rotation with the second member rotatably couples the internal combustion engine with an electric machine.

In a further non-limiting embodiment of any of the foregoing clutch devices, an electrified vehicle includes the clutch device, and the first member and the second member form portions of an overdrive clutch.

A method of driving an electrified vehicle clutch according to yet another exemplary aspect of the present disclosure includes, among other things, rotating a plurality of driving surfaces of a first member about an axis to rotate a second member, and rotating the second member against a plurality of driven surfaces of the first member to rotate the driven surface. The plurality of driving surfaces and the plurality of driven surfaces are angled differently relative to the axis.

In a further non-limiting embodiment of the foregoing method, the method includes moving the first member and the second member axially relative to each other from a coupled position where the first member and the second member are coupled in rotation with each other to a decoupled position where the first member and the second member are not coupled in rotation together.

In a further non-limiting embodiment of any of the foregoing methods, the method includes placing the first member and the second member in the coupled position to rotatably couple an internal combustion engine to a drive shaft of an electric vehicle.

In a further non-limiting embodiment of any of the foregoing methods, the method includes placing the first member and the second member in the decoupled position to rotatably couple the internal combustion engine to an electric drivetrain.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a clutch in a powertrain of an electrified vehicle. The clutch has interfacing surfaces that are angled to facilitate smoothly disengaging the clutch.

Figure 1:
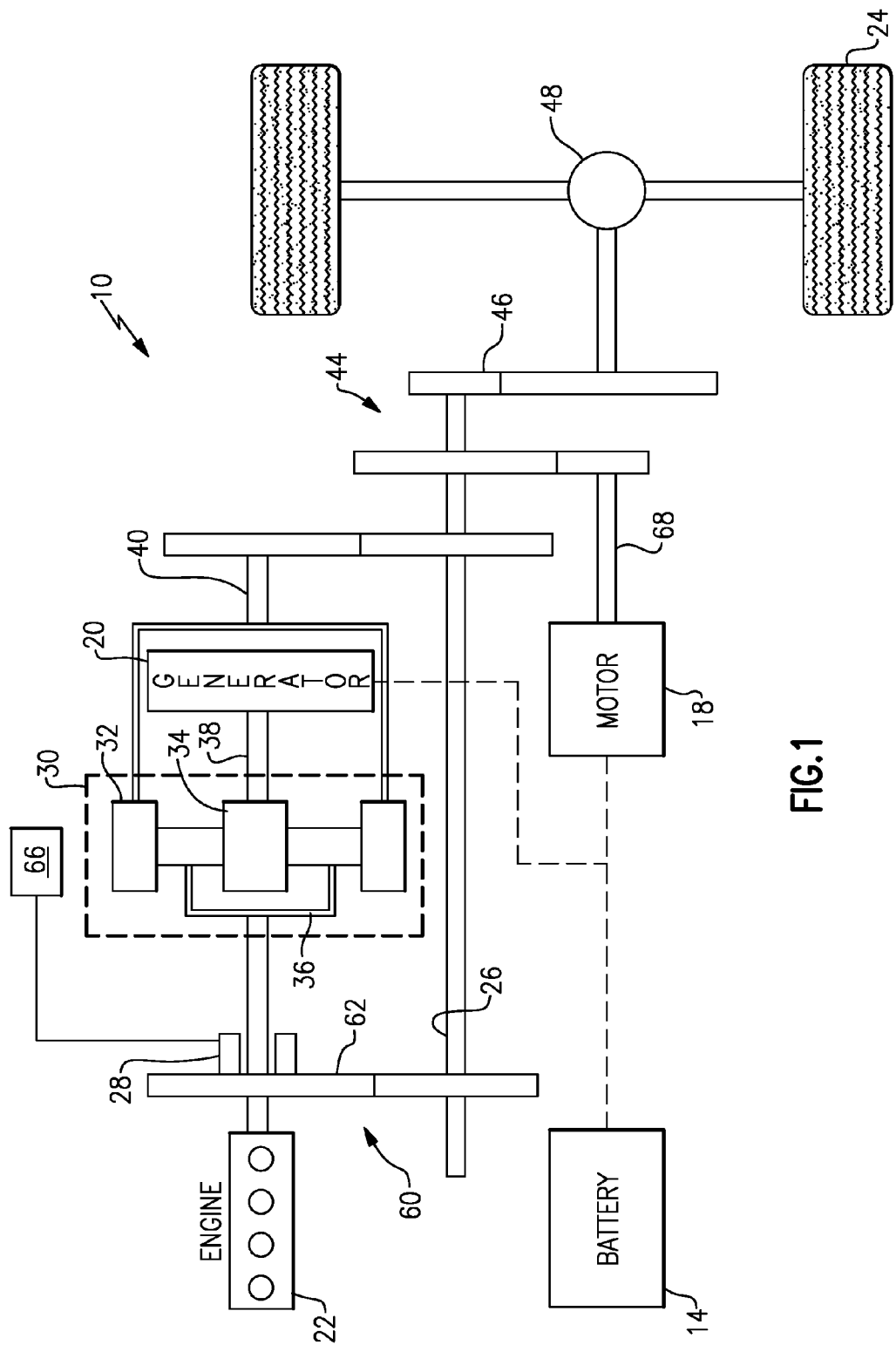
FIG. 1 shows a schematic view of an example electrified vehicle powertrain.
Figure 2:
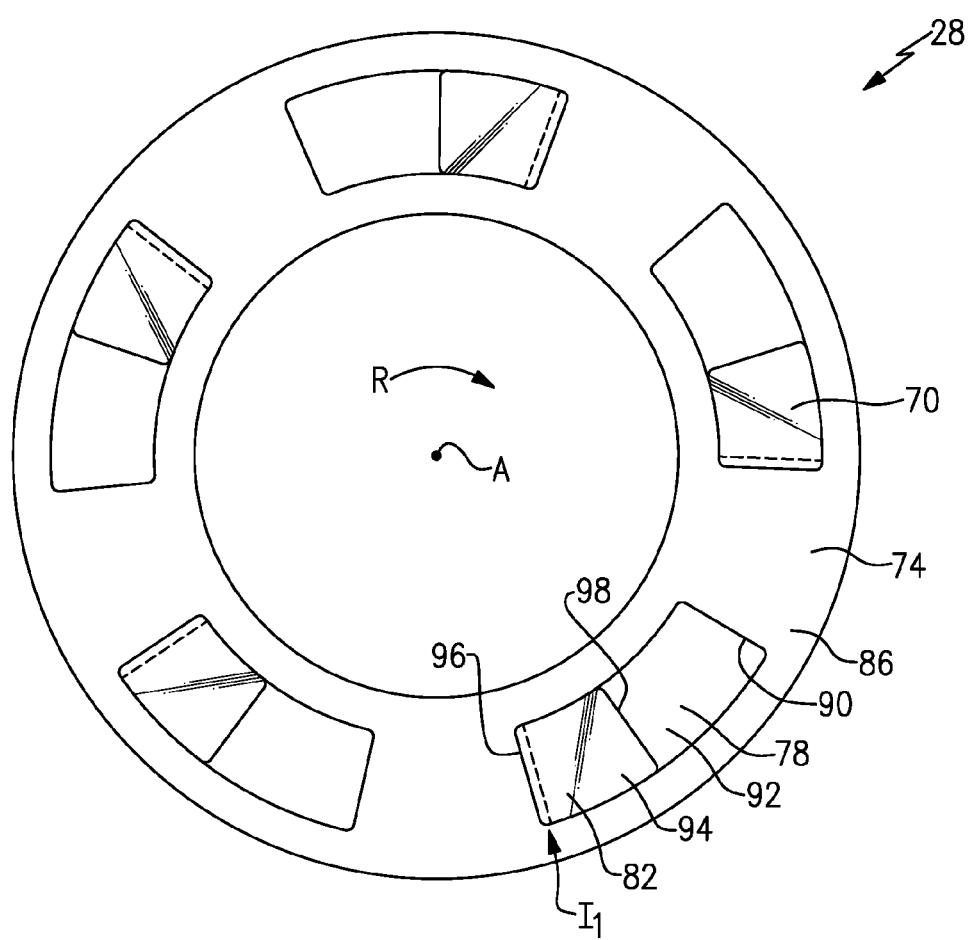
FIG. 2 shows a schematic end view of an example clutch device from the powertrain of FIG. 1 when the clutch device is under positive torque.
Figure 3:
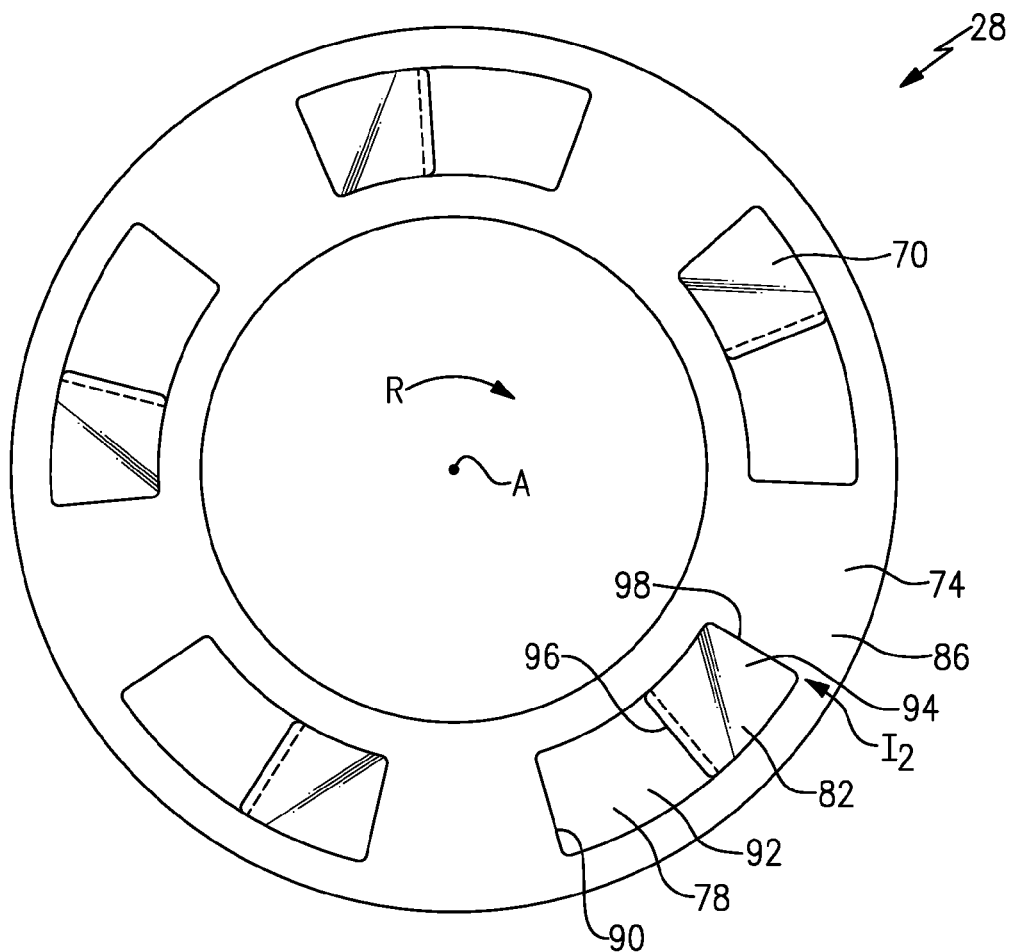
FIG. 3 shows a schematic end view of the clutch device of FIG. 2 when the clutch device is under negative torque.
Figure 4:
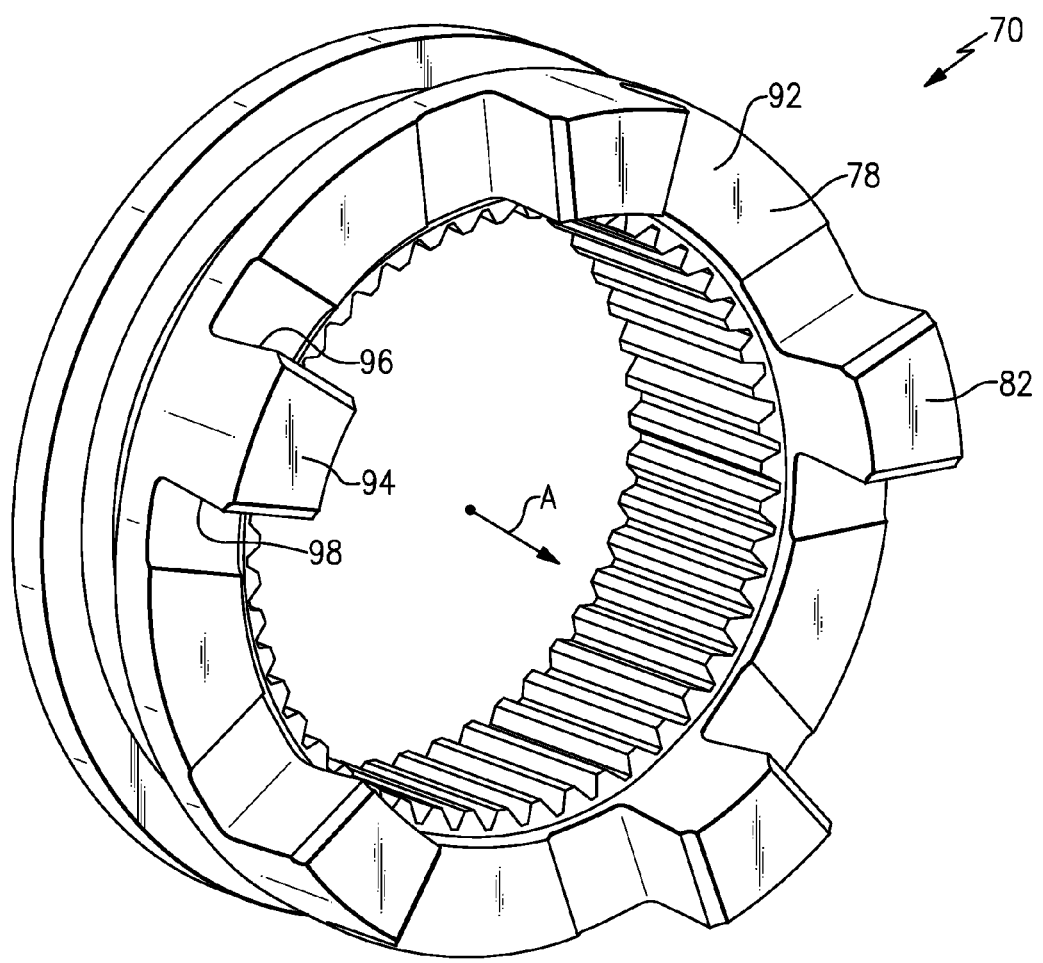
FIG. 4 shows a perspective view of a portion of the clutch device of FIG. 2
Figure 5:
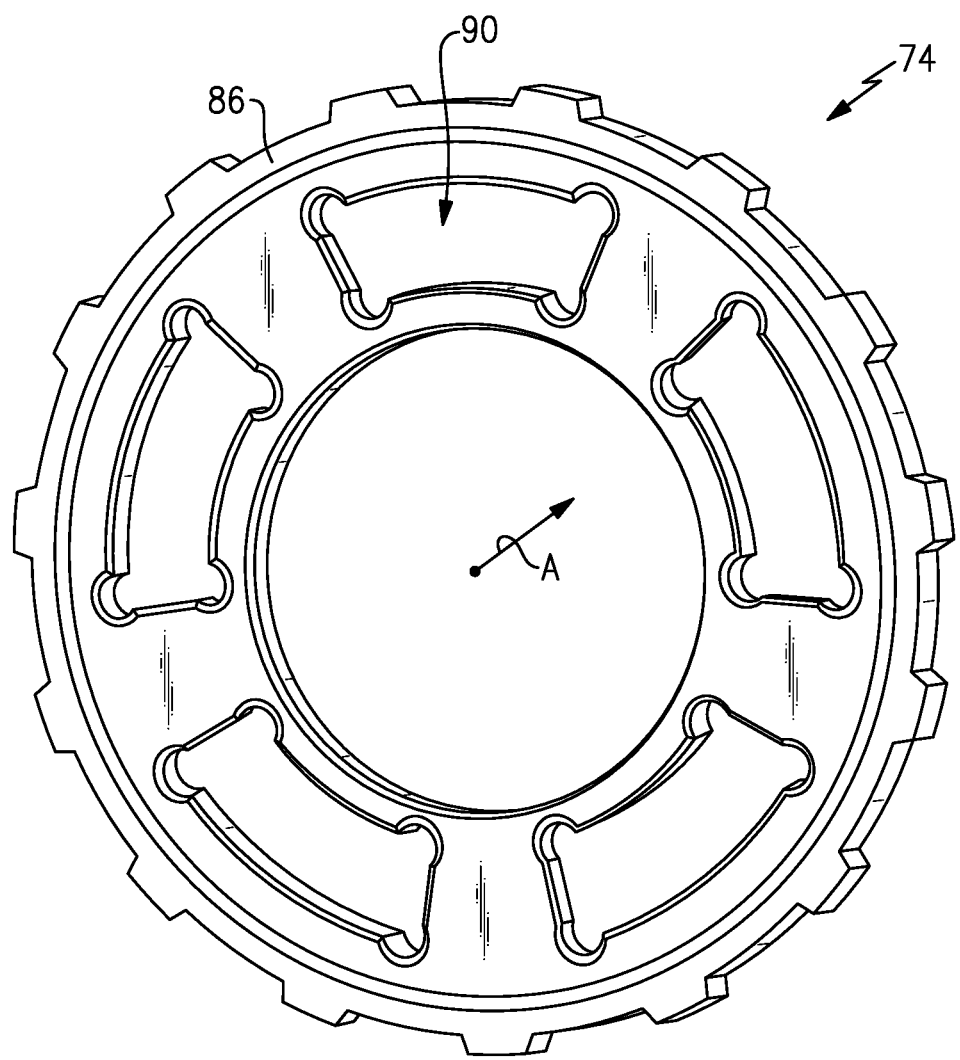
FIG. 5 shows a perspective view of another portion of the clutch device of FIG. 2.
Figure 6:
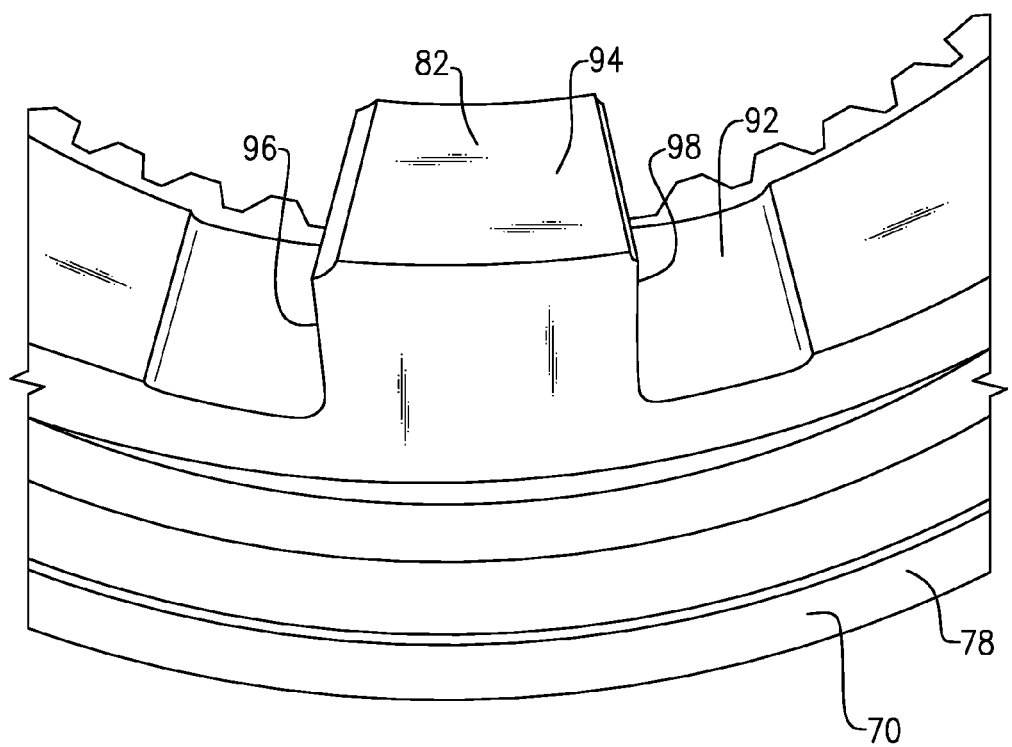
FIG. 6 shows a close-up perspective view of a lug from the portion of FIG. 4.

Referring to FIG. 1, an example powertrain 10 for a hybrid electric vehicle (HEV) includes a battery 14, a motor 18, a generator 20, and an internal combustion engine 22. The motor 18 and generator 20 are separate electric machines. In other examples, the motor 18 and generator 20 have the form of a combined motor/generator. The example engine 22 is an internal combustion engine.

The powertrain 10 is a power-split powertrain that provides a first drive system and a second drive system of the vehicle. The first and second drive systems can both generate torque. The first drive system includes at least the engine 22. The second drive system is an electric drive system and includes at least the motor 18, the generator 20, and a battery 14. The powertrain 10 selectively employs the first drive system or the second drive system to drive a driveshaft to rotate one or more wheels 24 and move the vehicle. The engine 22 may be stopped when the second drive system is used to rotate the wheels.

When the first drive system is used to drive the wheels 24, the engine 22 is selectively coupled to the generator 20. The selective coupling controls whether the engine 22 drives the wheels 24 through the generator 20 or bypasses the generator 20 when driving the wheels 24.

For example, when the vehicle is in overdrive, the engine 22 can be rotatably decoupled from the generator 20 and drive the wheels 24 in parallel to the generator 20. The engine 22 can be coupled to a shaft 26 in parallel to the generator 20 to drive the wheels 24 in parallel to the generator 20.

By contrast, when the vehicle is in overdrive, the engine 22 can be coupled to the generator 20 and drive the wheels 24 through the generator 20.

A clutch device 28 is actuated back and forth between an engaged position and a disengaged position to control coupling of the generator 20 and the shaft 26. The example clutch device 28 is considered an overdrive clutch since the clutch device 28 is engaged and disengaged in response to an overdrive mode. The clutch device 28 could actuate in response to other factors instead of, or in addition to, the overdrive mode.

When the clutch device 28 is disengaged, the engine 22 is rotatably coupled to the generator 20 through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to rotatably connect the engine 22 and the generator 20.

When the clutch device 28 is disengaged, the generator 20 can be driven by the engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. The engine 22 may be stopped when the generator 20 is operating as a motor.

The ring gear 32 of the power transfer unit 30 may be connected to a shaft 40, which is connected to the wheels 24 through a second power transfer unit 44 that includes a gear set having a plurality of gears 46. Other power transfer units may also be suitable. The gears 46 transfer torque from the engine 22 to a differential 48 to ultimately provide traction to the wheels 24. The differential 48 may include a plurality of gears that enable the transfer of torque to the vehicle wheels 24.

When the clutch device 28 is disengaged, the motor 18 can be employed to drive the vehicle wheels 24 by outputting torque to a shaft 68 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery 14.

The battery 14 is an example type of electric vehicle battery assembly. The battery 14 may be a relatively high-voltage battery that is capable of outputting electrical power to operate the motor 18 and the generator 20. Other types of energy storage devices, output devices, or both can also be used with the powertrain 10.

When the clutch device 28 is engaged, the engine 22 drives the wheels 24 through a power transfer unit 60 having a plurality of gears 62 linked to the shaft 26. When the clutch device 28 is engaged, the engine 22 drives the wheels 24 through the shaft 26, which operates in parallel to the power transfer unit 30. Thus, when the clutch device 28 is engaged, power from the engine 22 is no longer split into the power transfer unit 30 of the powertrain 10.

An actuator 66 can apply force to portions of the clutch device 28 to engage and disengage the clutch device 28. The example clutch device 28 is a dog clutch, and the actuator 66 may move portions of the clutch device 28 axially relative to each other to engage and disengage the clutch device 28. The actuator 66 could be hydraulic, pneumatic, electrical or some other type. A person having skill in this art and the benefit of this disclosure can understand how to design an actuator suitable for moving portions of a clutch.

When the clutch device 28 is disengaged and the engine 22 is rotatably coupled to the generator 20, the generator 20 provides a sensing capability for monitoring torque and speed differences across the clutch device 28. The sensing of torque across the clutch device 28 when engaging the clutch device 28 is accomplished via the power transfer unit 30 and specifically the generator 20. Rotational speeds can be monitored through the generator 20 and the motor 18 speed matched to minimize disruptions when the clutch device 28 is moved by the actuator 66 from the disengaged position to the engaged position.

Notably, when engaged, the clutch device 28 carries road load torque from the wheels 24. Information about torque across the clutch device 28 during disengagement can facilitate disengagement. The generator 20 is decoupled from the clutch device and unable to monitor this information. In place of the generator 20, another torque estimator may have to be used to monitor the information about torque across the clutch device 28. The generator 20 often provides more accurate information about torque than many other torque estimators. Also, if the generator 20 is decoupled from the clutch 28, speed difference information is also lost as there is effectively zero speed difference when the clutch device 28 is engaged.

When the clutch device 28 is engaged and the engine 22 is driving the wheels 24 in parallel to the power transfer unit 30, the clutch device 28 is under positive torque. When the clutch device 28 is engaged and power from the engine 22 is reduced, the road load is driving the rotation of the clutch device 28 rather than the engine 22. The clutch device 28 is then under negative torque. The clutch device 28 is moved by the actuator 66 from the engaged position to the disengaged position when the clutch device 28 is under negative torque.

In some situations, the clutch device 28 is moved by the actuator 66 from the engaged position to the disengaged position when the clutch device 28 is under positive torque. Such situations may include when a faster response is more important than a relatively smooth disengagement. Other situations may include failure mode effect management actions.

How torque transfers through the clutch device 28 between the first member 70 and the second member 74 changes based on whether the torque is positive or negative. In this example, there is no sensor to monitor negative torque across the clutch device 28. The actuator 66 is thus designed to apply a force sufficient to disengage the clutch device 28 if the torque across the clutch device 28 is low enough. The force can vary depending on the design of the clutch device 28. The example clutch device 28 includes features to reduce the force required to disengage the clutch device 28, which can reduce disruptions.

In this example, the interfaces of the clutch device 28 that transmit positive torque are different than the interfaces of the clutch device that transmit negative torque. More specifically, the interfaces of the clutch device 28 that carry negative torque have a reduced angle relative to the interfaces that carry positive torque. The reduced angle of the interfaces that carry negative torque lessens the amount of disengagement force required to disengage the clutch device 28, which reduce disruptions when the clutch device 28 is moved by the actuator 66 from the engaged position to the disengaged position.

Referring now to FIGS. 2 to 7 with continuing reference to FIG. 1, the example clutch device 28 includes a first member 70 and a second member 74. The first member 70 includes a ring portion 78 and a plurality of lugs 82 extending from the ring portion 78. A plurality of teeth project radially inward from the ring portion. The second member 74 includes a ring portion 86 and a plurality of apertures 90.

The lugs 82 and apertures 90 are distributed annularly about an axis A. The lugs 82 extend axially from an axially facing surface 92 of the ring portion 78 and terminate at a surface 94. Each of the lugs 82 includes a driving surface 96 and a driven surface 98 laterally spaced from each other. The driving surface 96 and the driven surface 98 for each of the lugs 82 face circumferentially away from each other. The driving surfaces 96 and the driven surfaces 98 extend from the axially facing surface 92 to the surface 94.

The apertures 90 have a dog-bone shaped profile and extend axially through the second member 74. In another example, the apertures 90 do not extend axially through the second member 74. The apertures 90 are circumferentially continuous about their perimeters. In another example, the apertures 90 may be slots within the second member When the clutch device 28 is in an engaged position, the lugs 82 are received axially within the apertures 90, which causes the first member 70 and the second member 74 to rotate together. When the clutch device 28 is in a disengaged position, the lugs 82 are withdrawn from the apertures 90.

In other examples, the first member 70 can include apertures and the second member 74 can include lugs. In still other examples, the first member 70 and the second member 74 each include some lugs and some apertures.

The actuator 66 moves the first member 70 axially relative to the second member 74 to insert the lugs 82 within the apertures 90 and to withdraw the lugs 82 from the apertures 90. A person having skill in this art and the benefit of this disclosure would understand how to move the first member 70 and the second member 74 axially relative to each other to move the lugs 82 between a position inserted within the apertures 90 in a position withdrawn from the apertures 90.

In this example, when the clutch device 28 is engaged and under positive torque (FIG. 2), the engine 22 drives rotation of the first member in a direction R. Contact between driving surfaces 96 of the lugs 82 and the second member 74 causes the second member 74 to rotate with the first member 70. Contact between the driving surfaces 96 and the second member 74 provides a first interface $I_1$. The example clutch device 28 includes five first interfaces $I_1$ when the clutch device 28 is engaged and under positive torque.

When the clutch device 28 is engaged and under negative torque, the road load drives rotation of the second member 74. When the clutch device 28 is under negative torque, the first member 70 and the second member 74 are rotated slightly circumferentially relative to each other such that driven surfaces 98 of the lugs 82 contact the second member 74. Contact between the driven surfaces 98 and the second member 74 causes the first member 70 to rotate in the direction R in response to rotation of the second member 74. Contact between the driven surfaces 98 and the second member 74 provides a second interface $I_2$. The example clutch device 28 includes five second interfaces $I_2$ when the clutch device 28 is engaged and under negative torque.

In this example, the angle of the first interfaces $I_1$ is different than the angle of the second interfaces $I_2$ relative to the axis A. The difference in the angle facilitates withdrawing the lugs 82 from the apertures 90 when the clutch device 28 is under negative torque.

Figure 7:
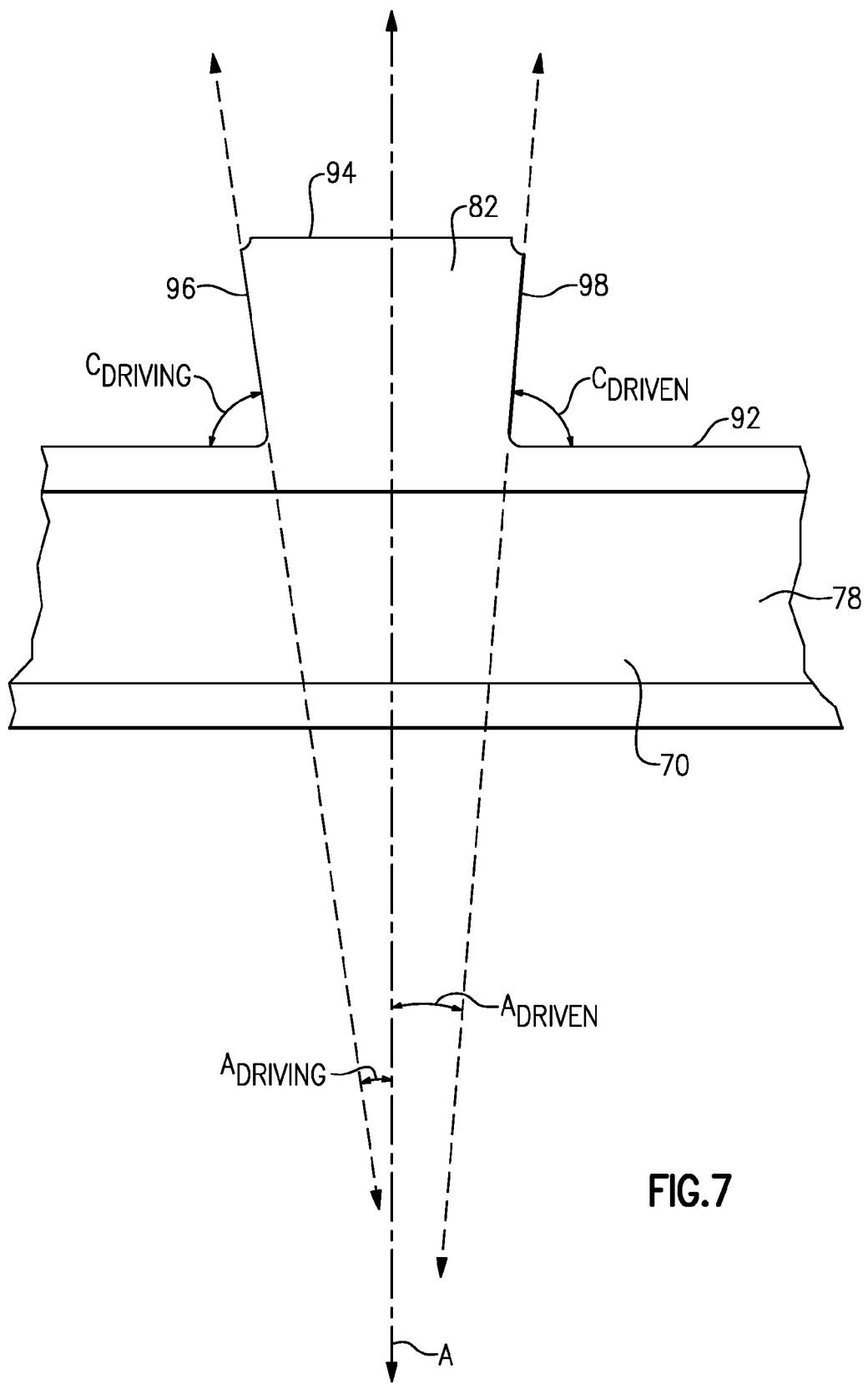
FIG. 7 shows a view of the lug of FIG. 6 from a position facing radially inward toward an axis of the clutch device.

In this example, the driving surfaces 96 and the driven surfaces 98 are angled differently to cause the difference in the angles of the interfaces $I_1$ and $I_2$ The driving surfaces 96 are defined generally by radially extending planes that are disposed at an angle $A_{DRIVING}$ relative to the axis A (FIG. 7).

The driven surfaces 98 are defined generally by radially extending planes that are disposed at an angle $A_{DRIVEN}$ relative to the axis A.

The example driving surfaces 96 and driven surfaces 98 both taper in from the surface 94. The angle $A_{DRIVEN}$, however, is less than the angle $A_{DRIVING}$. The driven surfaces 98 thus can be considered to have a "flatter" angle than the driving surfaces 96. The flatter angle facilitates disengaging the clutch device 28 as there is less resistance between the first member 70 and the second member 74 when the driven surfaces 98 slide axially relative to the second member 74 during disengagement.

In one specific example, the angle $A_{DRIVING}$ is from two to five degrees, and the angle $A_{DRIVEN}$ is from zero to two degrees.

Although the lugs 82 include driving surfaces 96 and the driven surfaces 98 at different angles, those skilled in the art would understand that opposite circumferential sides of the apertures 90 could be angled differently to achieve a similar result. The opposing circumferential sides of the apertures 90 may be angled instead of, or in addition to, the circumferentially facing driving surfaces 96 and driven surfaces 98 of the lugs 82.

The differences between the angles of the driving surfaces 96 and the driven surfaces 98 can also be recognized with reference to the axially facing surface 92. An angle $C_{DRIVING}$ between the driving surface 96 and the axially facing surface 92 is less than an angle $C_{DRIVEN}$ between the driven surfaces 98 and the axially facing surface 92.

The example powertrain 10 is described in connection with an HEV. The concepts described herein are not limited to HEV powertrains, however, and could extend to the powertrains of other electrified vehicles, including, but not limited to, plug-in hybrid electric vehicles (PHEVs) and battery electric vehicles (BEVs).

Features of many of the disclosed examples include a positive side of a dog clutch (the side engaged during positive torque across the clutch) that is cut to carry torque while allowing the actuation force to be reduced (or be zero). This angle will increase the force needed to guarantee disengagement the clutch at a near zero torque level across the clutch. Near zero, in this example, means "within the tolerance of torque during dis-engagement." At the high limit of this torque during disengagement, the system is typically designed to disengage with relatively little disturbances.

Changing the angle on the negative torque side of the dog clutch (the side engaged during negative torque across the clutch) allows for a larger negative torque tolerance while still ensuring disengagement with the same deactuation force.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A clutch device of an electrified vehicle, comprising:
a first member distributed annularly about an axis; and
a plurality of lugs each including a driving surface and a driven surface disposed at different angles relative to the axis, the driving surface facing circumferentially and selectively contacting a second member to rotate the second member and couple an engine with a drive shaft arranged in parallel to an electric drive system, the driven surface facing circumferentially and selectively contacting the second member to rotate the first member, the engine configured to drive the electric drive system when the clutch device is disengaged.

2. The clutch device of claim 1, wherein the first member is moveable relative to the second member along the axis from an engaged position with the second member to a disengaged position with the second member.

3. The clutch device of claim 2, wherein the plurality of lugs are received within apertures of the second member when the first member is in the engaged position, and the plurality of lugs are withdrawn from the apertures when the first member is in the disengaged position.

4. The clutch device of claim 1, wherein an angle between the driving surface and the axis is greater than an angle between the driven surface and the axis.

5. The clutch device of claim 4, wherein the driving surface and the driven surface are planar.

6. The clutch device of claim 1, wherein an inner diameter of the first member includes a plurality of teeth projecting inwardly toward the axis.

7. The clutch device of claim 1, wherein the driving surface and the driven surface taper.

8. The clutch device of claim 1, wherein the first member is a portion of a dog clutch.

9. A clutch device, comprising:
a first member having a plurality of lugs that are selectively moveable axially to engage corresponding apertures of a second member to rotatably couple an engine with a drive shaft, the engine rotatably coupled with an electric machine when the first and second members are disengaged, wherein interfaces between the first and second members under positive torque are angled differently than interfaces under negative torque.

10. The clutch device of claim 9, wherein the plurality of lugs extend from an axially facing surface of the first member, each of the plurality of lugs having a first side and a second side, the first side facing in a first circumferential direction and disposed at a first angle relative to the axially facing surface, the second side facing in an opposite, second circumferential direction and disposed at a second angle relative to the axially facing surface, the first angle different than the second angle.

11. The clutch device of claim 9, wherein the interfaces between the first member and the second member under positive torque have a first angle relative to the axis, and the interfaces between the first member and the second member under negative torque have a second angle relative to the axis that is less than the first angle.

12. The electrified vehicle of claim 9, wherein the first member and the second member form portions of an overdrive clutch.

13. A method of driving an electrified vehicle clutch, comprising:
rotating a plurality of driving surfaces of a first member about an axis to rotate a second member and rotatably couple an internal combustion engine to a drive shaft of an electric vehicle;
rotating the second member against a plurality of driven surfaces of the first member to rotate the driven surface, wherein the plurality of driving surfaces and the plurality of driven surfaces are angled differently relative to the axis; and
rotatably coupling the internal combustion engine to an electric drivetrain when the first and second member are in a decoupled position.

14. The method of claim 13, further comprising moving the first member and the second member axially relative to each other from a coupled position where the first member and the second member are coupled in rotation with each other to a decoupled position where the first member and the second member are not coupled in rotation together, the moving during the rotating of the second member against the plurality of driven surfaces.

* * * * *